Sept. 17, 1968
G. A. TEREZAS
3,401,650
STEP SAVER UTILITY CART
Filed Jan. 20, 1967
4 Sheets-Sheet 1
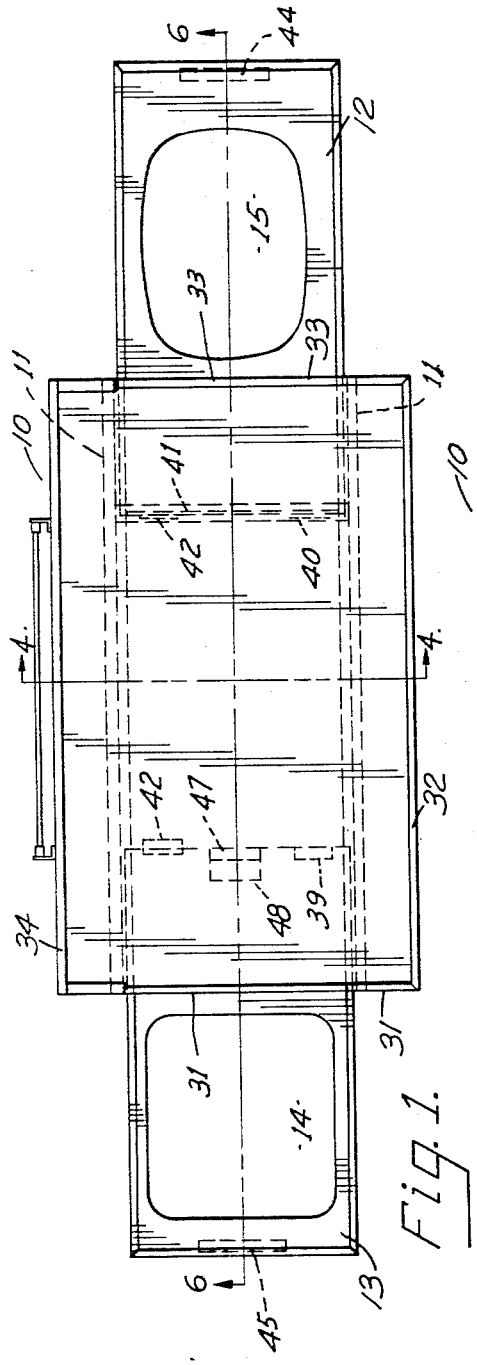
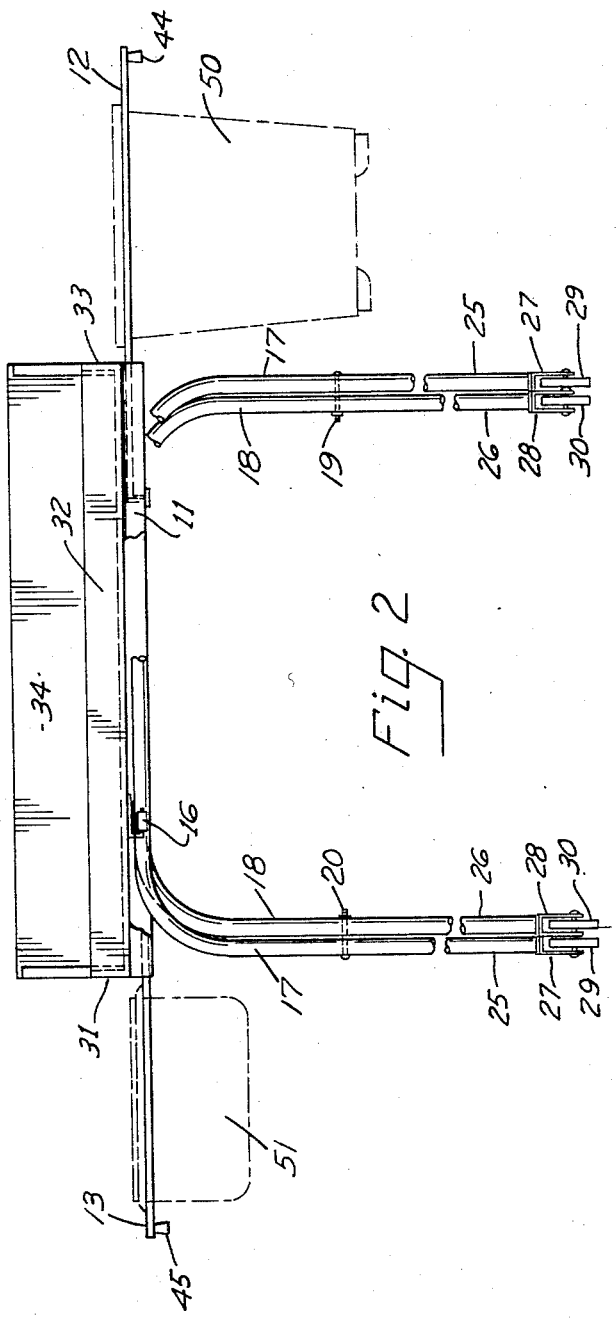
INVENTOR.
Geraldine Ann Terezas
BY
ATTORNEY.

Sept. 17, 1968     G. A. TEREZAS     3,401,650
STEP SAVER UTILITY CART
Filed Jan. 20, 1967     4 Sheets-Sheet 2
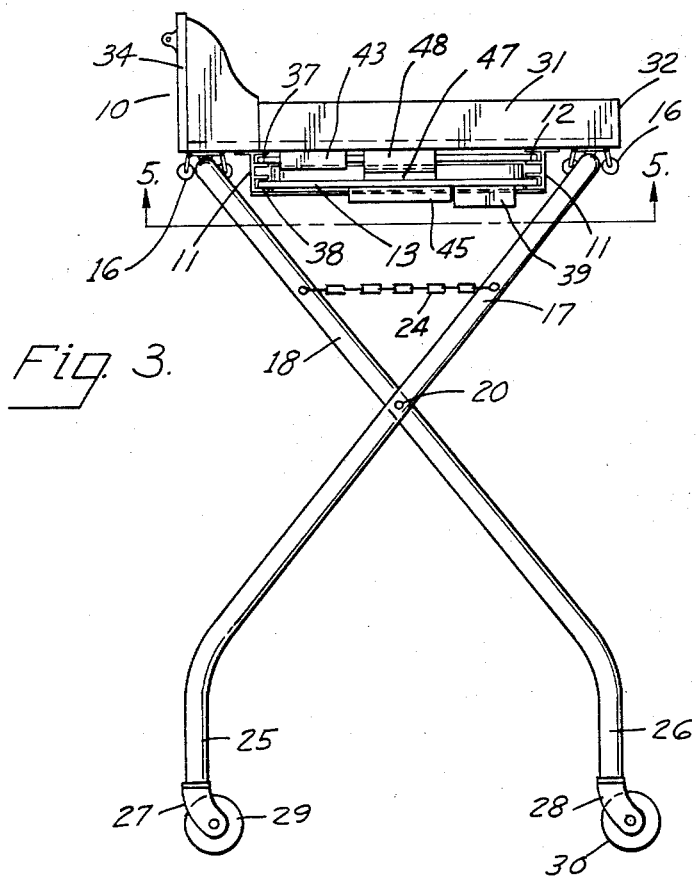
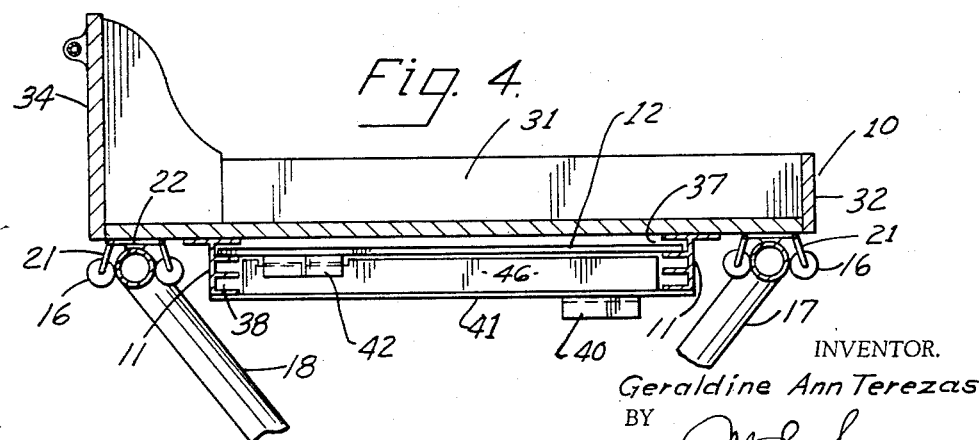
INVENTOR.
Geraldine Ann Terezas
BY
ATTORNEY.

Sept. 17, 1968 G. A. TEREZAS 3,401,650
STEP SAVER UTILITY CART
Filed Jan. 20, 1967 4 Sheets-Sheet 3
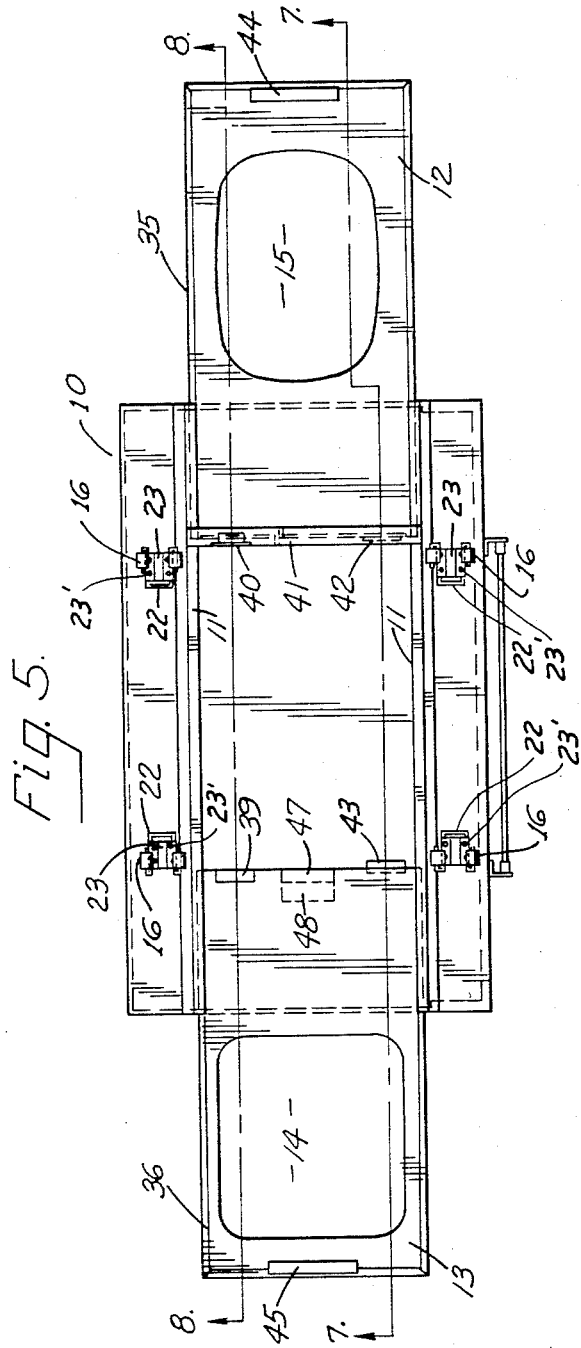
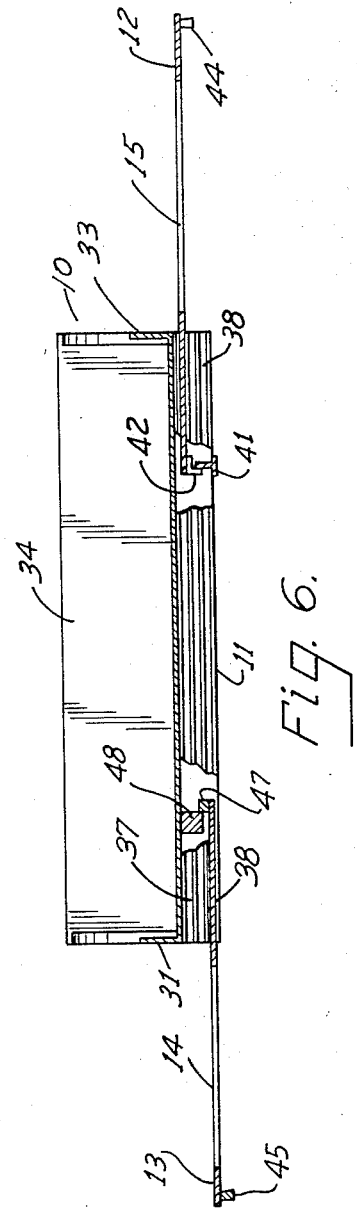
INVENTOR.
Geraldine Ann Terezas
BY
ATTORNEY.

Sept. 17, 1968     G. A. TEREZAS     3,401,650
STEP SAVER UTILITY CART
Filed Jan. 20, 1967     4 Sheets-Sheet 4
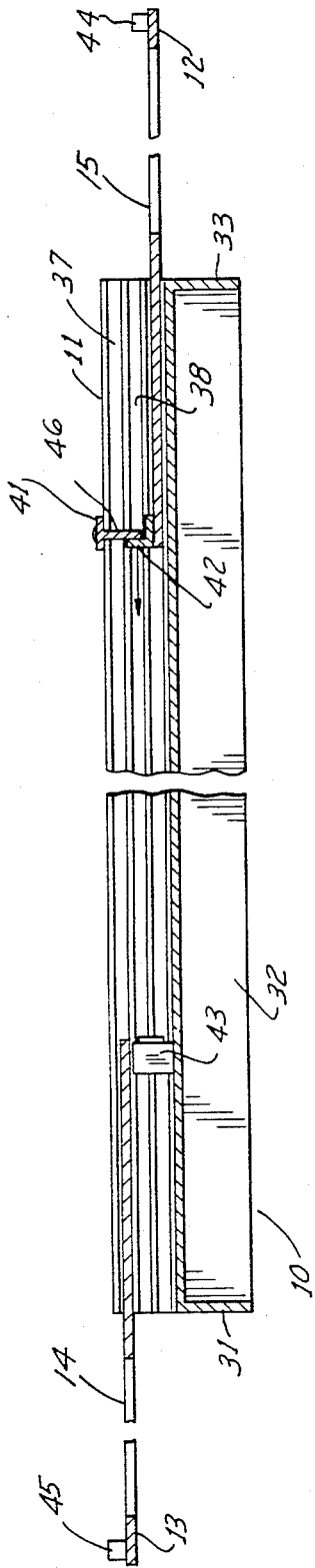
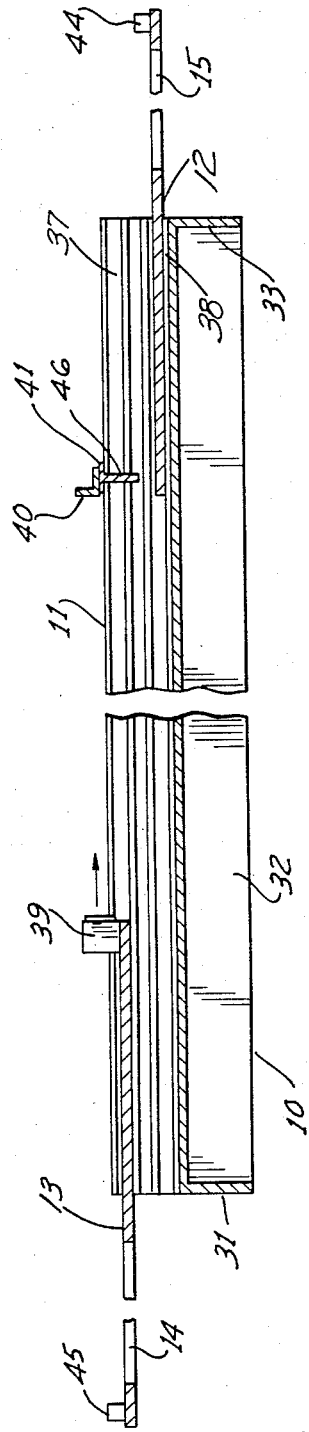
INVENTOR.
Geraldine Ann Terezas
BY
ATTORNEY.

United States Patent Office 3,401,650
Patented Sept. 17, 1968

3,401,650
STEP SAVER UTILITY CART
Geraldine Ann Terezas, c/o St. Vincent Charity Hospital, 2222 Central Ave., Cleveland, Ohio 44115
Filed Jan. 20, 1967, Ser. No. 610,654
9 Claims. (Cl. 108—25)

ABSTRACT OF THE DISCLOSURE

The disclosure herein contained comprises a wheeled utility cart having extensions movable outwardly from the ends thereof to extended positions and adapted for holding receptacles of different kinds beyond the ends of said cart. Means are disclosed for detachably mounting a table portion of the cart to foldable legs thereof whereby the wheeled utility cart herein disclosed is collapsible.

My invention relates to a utility cart and relates more particularly to a wheeled utility cart adapted for use in hospitals and other institutions, which cart is adapted to be used as a table for transporting or storing linens and other sterile material, or for other desired purposes, and at the same time adapted to have extendable sections for carrying waste, refuse, trash, or the like, in detachable receptacles and/or for containers for other purposes.

It is an object of my invention to provide a utility cart of the type referred to wherein contaminated or unsterile material can be carried in sections spaced from sections containing sterile materials.

It is a further object of my invention to provide a utility of the type referred to which is collapsible and adapted to be folded whereby only a minimum of storage space will be required.

Another object of my invention is to provide a utility cart and/or movable table of the type referred to which will be provided with means for conveying, in an improved manner, clean and sterile materials for patients and removing contaminated and unsterile materials therefrom on a cart without fear of contact between the sterile and unsterile materials.

A further object of my invention is to provide a utility cart of the type referred to which will be economical in construction, being composed of but few parts, highly efficient in use, and relatively durable.

Other objects of my invention and the invention itself will become more readily apparent by reference to the drawings and description appended hereto, in which drawings:

FIGURE 1 is a top view of the utility cart of my invention showing the arms in extended position;

FIGURE 2 is a front view of the utility cart of my invention;

FIGURE 3 is a side view of the utility cart of FIGURES 1 and 2;

FIGURE 4 is a sectional view taken on line 4—4 of FIGURE 1;

FIGURE 5 is a view taken on line 5—5 of FIGURE 3;

FIGURE 6 is a view taken on line 6—6 of FIGURE 1, illustrating stop means for the extended arms or wings of the cart;

FIGURE 7 is a sectional view taken on line 7—7 of FIGURE 5;

FIGURE 8 is a sectional view taken on line 8—8 of FIGURE 5.

Referring now to the drawings in all of which like parts are designated by like reference characters, the cart of my invention is shown as comprising a main table section 10, having spaced parallel guide channels 11 secured to the bottom thereof which afford guide means for a pair of longitudinally slidable table extensions 12, 13; one extension overlaps the other said extension and both said extensions are preferably provided with openings 14, 15, respectively, therein, wherein receptacles and/or waste containers or the like, as shown and later described herein, are carried.

On either side of the said guide channels 11 spring pressed roller means 16 are disposed adapted to releasably clamp the yoke of spaced pivotally connected pairs of legs, said legs 17, 18, being pivotally connected as shown at 19, 20. The rollers are, in the modification of my invention shown herein, mounted on reversely bent ends 21 of U-shaped spring means 22, which means 22 are rigidly secured to the underside of the table by brackets 23 and rivets 23' as shown. The legs, as shown, are preferably formed of tubular metal framing and are connected as by chain means 24 secured to a leg of each of said pair of legs above the pivotal connection of said legs, as by bolts, to limit the relative open position thereof and to enable the yokes to be aligned with the roller means when the said legs are in their open position. The lower ends of the legs are preferably provided with a pair of vertically extending lower portions 25, 26 carrying caster means 27, 28 supporting wheels 29, 30.

The table top, which is the main body portion of the utility cart, is preferably provided with upstanding sides 31, 32, 33, and a relatively higher back section 34. It is preferably provided with a liner of Formica or other durable sanitary covering material.

The extensions 12, 13 are, as shown, generally formed of rectangular frame strips of wood or the like and each forms a wing as shown for the table; the wing 12, as shown, having a generally oval opening 14 and the wing 13, as shown, has a generally rectangular opening 15 therein. The extension members are, in form shown, preferably framed with generally U-shaped metallic slide members 35, 36 which are adapted to ride in U-shaped channels 37, 38 provided in the guide members, as shown. The extension 12 rides in the uppermost disposed channel 37, as shown in FIGURE 7, and the extension 13 rides in the lowermost channel 38, as shown in FIGURE 3.

A magnet means 39 is carried on the underside of the inner end of the slide arm 13 and said means 39 is adapted to contact metallic means 40 which in the form shown is mounted on a cross bar 41 secured at opposite ends to an opposite of said spaced guide members 11, wherefore, when the slide arm 13 is in its fully retracted position at the inner end of the same, the magnet 39 abuts the said cross bar and is magnetically coupled to the stop 40, the extension being locked thereby in its rearmost retracted position beneath the table top. The uppermost extension 12, as shown, is provided at its innermost end with a metallic stop 42 similar to the stop 40 and said stop is adapted to contact a magnet 43 mounted on the underside of the table, when said extension is in its fully retracted position. The same is thereby locked against accidental dislodgement from its fully retracted table underlying position. To break the magnetic coupling between the table and the extensions, the operator exerts manual force on a handle 44 disposed underneath the outermost edge of the extension 12 and/or upon a handle 45 disposed beneath the outermost end of the slidable table extension 13, to overcome the magnetic force. To hold the extension 12 in its fully extended position, the stop 42 is adapted to abut, in its fully extended position, a depending flange 46 of the crossbar 41. The extension 13 is likewise provided with a stop 47 which abuts a lug 48 secured to the underside of the table centrally thereof, as shown, when it is in its fully extended position.

It is to be understood that the extension members 12 and 13 of the utility cart shown are adapted to be secured in either extended or retracted position relative to the table 10 and that the said extensions are preferably provided with openings for carrying wastepaper baskets, etc., as shown at 50, and a plastic basin as shown at 51. The table 10 further is preferably provided with an upstanding rim portion around the outer periphery thereof and is preferably adapted to provide a clean linen carrying section, the nonsterile articles being carried by the extensions and hence separated from the sterile carrying portion of the cart.

Furthermore it is to be understood that the extensions may be retracted, the legs detached from the table top and the utility cart stored in a minimum space. Hospitals and other large institutions rendering personal services for which the cart is used encounter the common difficulty of having limited storage space for wheeled carts, cleaning supplies, etc. and various vehicles needed for other uses are often employed for moving cleaning supplies, etc.

The utility cart of this invention, it will be readily understood, may be provided with legs of various sizes and shapes and the same may be either secured to or detached from the table top of my invention by any preferred manner.

The invention particularly involves the provision of a table top of the type shown and described herein having extensions provided with means for receiving containers and/or receptacles for waste and/or contaminating material and maintaining the same in spaced relation to a central sterile material carrying section. Further the extensions are preferably of no wider and preferably lesser width than the width of the table top whereby the table may be easily moved through passages whether or not extended.

It will be further understood that various types of locking means may be employed and changes in size of the openings may be made without, however, departing from the spirit of the invention or the scope of the appended claims.

What I claim is:

1. A utility cart of the character described comprising a table top portion, at least one longitudinally slidable table extension, means providing guide means mounted beneath said table top portion, said table extension slidably interfitting said guide means, foldable leg means for supporting said table top portion, and attachment means mounted on the bottom of said table top portion for releasably mounting said table top portion to said foldable leg means, said table extension comprising a flat member, said guide means comprising a pair of channel shaped guideways adapted to slidably receive side edge portions of said table extension, means for releasably retaining said table extension in a fully retracted position within said guideways beneath said table top portion, and stop means limiting the outward movement of said table extension to a predetermined extended position.

2. A utility cart of the character described in claim 1; means defining a vertical opening through said table extension for receiving a removable receptacle.

3. A utility cart of the character described in claim 2; a first mounting means carried adjacent to the inner end of said table extension, a second mounting means carried beneath said table top and positioned adjacent to said inner end of said table extension when said table extension is in said fully retracted position, one of said mounting means having magnet means mounted thereto and the other said mounting means having a metallic stop mounted thereto whereby when said table extension is in said fully retracted position, said magnet means abuts said metallic stop and releasably retains said table extension in said fully retracted position.

4. A utility cart of the character described in claim 3; said table top portion having upstanding side members at the periphery thereof for separting articles disposed on said table top portion from articles disposed in a receptacle or container carried by said table extension.

5. A utility cart of the character described in claim 1; said leg means comprising two pairs of crossed legs, means pivoting said legs of each pair to each other, an integral yoke connecting a leg of each pair to a leg of the other pair, said attachment means comprising means for resiliently gripping said yokes, wheel means carried at the lower ends of said legs.

6. A utility cart of the character described in claim 5; said attachment means comprising pairs of rollers disposed a short distance below said table top portion and spring means mounting said rollers to said table top portion and biasing said rollers of each pair toward each other whereby said rollers of each pair snap over adjacent of said yokes for resiliently gripping said yokes.

7. A utility cart of the character described in claim 1; said table top portion having two longitudinally slidable table extensions, each said table extension comprising a flat member having substantially parallel side edge portions, said guide means comprising upper and lower pairs of substantially parallel, channel shaped guideways, each said guideway adapted to slidably receive the side edge portions of one of said table extensions, said table extensions being movable between retracted positions beneath said table top portion and extended positions whereby substantial portions of said table extensions project beyond opposite ends of said table top portion, and each said table extension having means defining a vertical opening therethrough for receiving a removable receptacle.

8. A utility cart of the character described in claim 7; upwardly projecting side wall members carried by said table top portion at the ends thereof whereby sanitary articles carried by said table top portion are effectively separated from contaminated articles carried in said receptacles.

9. A utility cart of the character described in claim 8; said leg means comprising two pairs of crossed, pivoted legs, a yoke connecting a leg of each pair to a leg of the other pair, said attachment means comprising means for resiliently gripping said yokes, and wheel means carried at the lower ends of said legs.

References Cited

UNITED STATES PATENTS

| | | | |
|---|---|---|---|
| 1,198,227 | 9/1916 | Hinchey | 108—504 XR |
| 1,942,344 | 1/1934 | Payne | 108—50 |
| 2,229,320 | 1/1941 | Balzano et al. | 108—25 XR |
| 2,624,469 | 1/1953 | Cadwell et al. | 108—116 XR |
| 2,802,578 | 8/1957 | Bariel | 108—120 XR |
| 3,099,356 | 7/1963 | Burnett | 108—111 |
| 3,295,475 | 1/1967 | McClellan | 108—153 |

BOBBY R. GAY, *Primary Examiner.*

G. O. FINCH, *Assistant Examiner.*